Patented Feb. 21, 1950

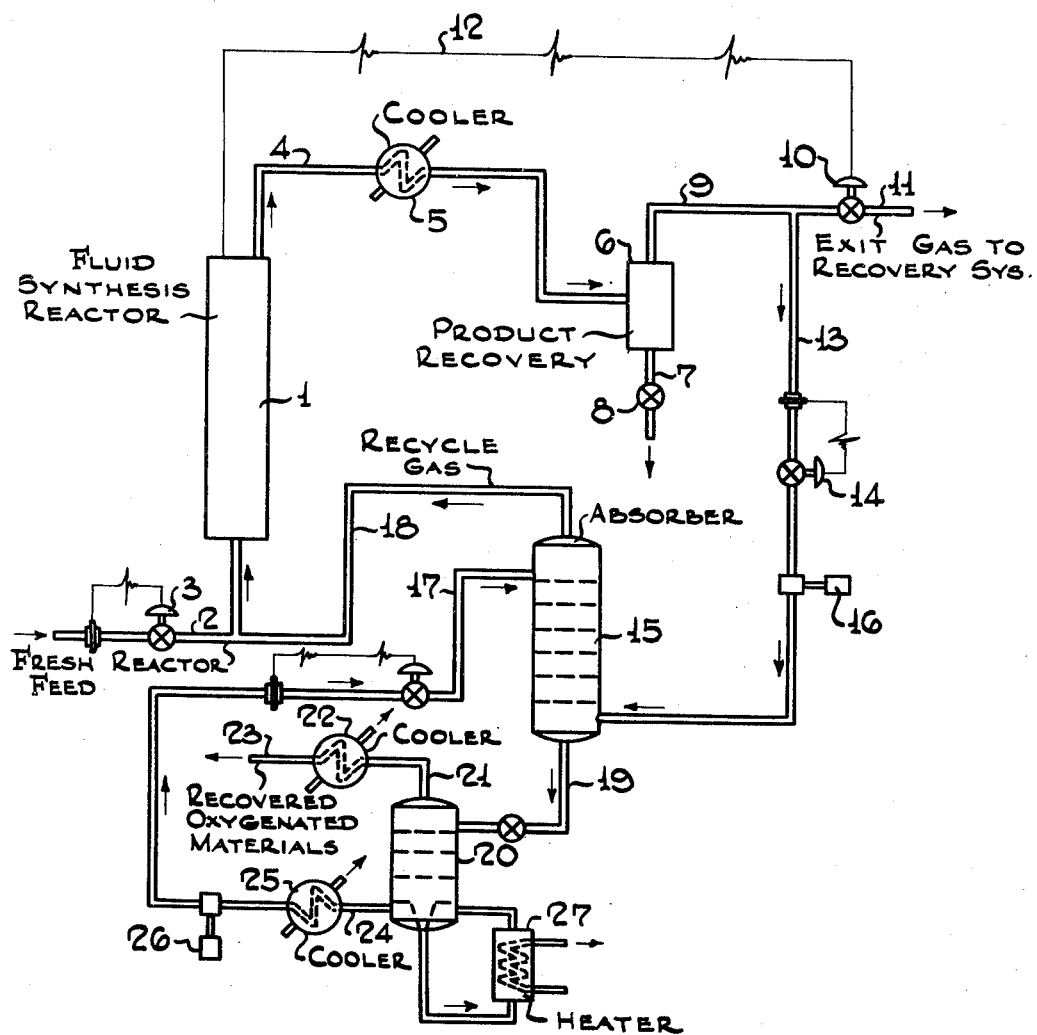

2,497,932

UNITED STATES PATENT OFFICE 2,497,932

HYDROCARBON SYNTHESIS OPERATION

Jack C. Dart, Baton Rouge, La., assignor to Standard Oil Development Company, a corporation of Delaware Application May 2, 1946, Serial No. 666,760

2 Claims. (Cl. 260—449.6)

The present invention relates to an improved hydrocarbon synthesis process. It is more particularly concerned with a hydrocarbon synthesis reaction wherein operating conditions are controlled in a manner to secure a good yield of the desired products with a minimum deterioration of the catalyst. In accordance with the present invention, the reaction gases are withdrawn from the reaction zone and cooled to condense out water and condensable hydrocarbons. The condensed products are removed from the uncondensed gases which uncondensed gases are treated to remove undesirable oxygenated compounds. These gases relatively free of oxygenated compounds are returned to the reaction zone.

It is well known in the art to conduct various hydrocarbon synthesis reactions by contacting hydrogen and oxides of carbon with various catalysts under specific temperature and pressure conditions. The catalysts employed are usually selected from the iron group metals as for example, iron, cobalt and nickel. These catalysts are employed either alone or on suitable carriers such kieselguhr, diatomaceous earth, pumice, silica and alumina. These catalysts are also employed in admixture with promoters such as oxides of chromium, zinc, aluminum, magnesium and the rare earth metals.

The temperatures employed vary widely as for example in the range from about 300° F. to 800° F. The temperatures however are generally in the range from about 350° F. to 700° F. The particular temperature employed will depend upon, among other factors, the type of non-gaseous hydrocarbon product desired, the character and the activity of the particular catalyst utilized and upon the throughput and composition of the feed gases introduced into the reaction zone as well as upon the reaction pressure. For instance, when utilizing a mixture of feed gases comprising carbon monoxide and hydrogen in the ratio of one mol of carbon monoxide per two mols of hydrogen at pressures in the range from atmosphere to 100 lbs./sq. inch and in the presence of a fresh cobalt catalyst, the reaction temperature is generally in the range from about 340° F. to 500° F. On the other hand, if similar feed gases are utilized and the pressure is about 300 lbs./sq. inch and if an iron catalyst is employed, the temperature is generally in the range from about 500° F. to 750° F.

The pressures likewise vary widely and depend upon the above enumerated operating conditions. In general the pressures are in the range from about atmospheric pressure to 300 lbs./sq. inch and higher.

In these operations, it is the usual practice to utilize once through operations. By this is meant, no recycling of the reactant gases is carried out. On the other hand, it is desirable in many respects to recycle at least a portion of the reactant gases removed from the reaction zone. This is generally accomplished by cooling the reactant gases removed overhead from the reaction zone in a cooling zone in order to condense water and condensable hydrocarbons. The uncondensed gases or at least a portion of these gases are recycled to the reaction zone. By operating in this manner it is possible to operate at a higher superficial velocity in the reaction zone as compared to a once through operation.

However, I have discovered that the catalysts life in the reaction zone is adversely affected by the various oxygenated products produced in the reaction zone and removed overhead with the reactant gases. I have discovered that if these oxygenated compounds are removed from the reactant gases before the reactant gases are recycled to the reaction zone unexpected desirable results are secured. In accordance with my invention, I propose to cool the reactant gases which are removed overhead from the reaction zone in a manner to condense water and condensable hydrocarbons. The uncondensed gases or at least a portion of the uncondensed gases in accordance with my process are treated in a treating zone to remove undesirable oxygenated compounds. In accordance with my invention, I propose to remove from the recycle gases specifically oxygenated compounds formed in the synthesis reaction which comprise for example, methyl alcohol, ethyl alcohol and higher alcohols, ketones and various ethers as for example methyl ethyl ketone, acetone, dimethyl ether and aldehydes, such as acetaldehyde.

The process of my invention may be more readily understood by referring to the attached drawing illustrating one modification of the same. Feed gases comprising oxides of carbon and hydrogen are introduced into reaction zone 1 by means of feed line 2. The quantity of feed gases introduced into the reaction zone is controlled by means of control valve 3. Temperature and pressure conditions in reaction zone 1 are maintained to secure the desired products. For purposes of illustration it is assumed reaction zone 1 comprises an iron catalyst. The temperature in the reaction zone is in the range from about 150° F. to 550° F. and the pressure maintained is in the range from about 200 p. s. i. g. to 750 p. s. i. g. After a sufficient time of contact, the reaction gases are removed overhead from the reaction zone 1 by means of line 4 passed through cooling zone 5 and introduced into separation zone 6. For the purpose of illustration cooling zone 5 is maintained at a temperature to cool the reactant gases to a temperature in the range from about 70° F. to 150° F. In separation zone 6, the condensed water and condensed hydrocarbons are removed by means of line 7 controlled by means of valve 8. This stream is handled in any manner to secure the separation of the condensed water from the hydrocarbons and to secure any desired cut of hydrocarbons. The uncondensed gases are removed overhead from separation zone 6 by means of line 9 and handled as hereinafter described.

A portion of the gases may be withdrawn through control valve 10 and removed from the system by means of line 11. The amount of gases withdrawn from the system by means of line 11 is preferably controlled by a pressure control system tied in with the pressure of reaction zone 1. Any suitable means may be used which is illustrated by means of broken line 12.

In accordance with my invention, I withdraw uncondensed reactant gases through line 13, through control valve means 14 and introduce these gases into the bottom of an absorption zone 15. These gases may be compressed to any desired pressure by means of compressor means 16.

These gases flow upwardly through absorption zone 15 and contact down flowing absorption means which is introduced into absorption zone 15 by means of line 17. The absorption medium may be any medium which will remove oxygenated compounds from the reactant gases. For the purpose of illustration, it is assumed that the absorption medium comprises polyethylene glycol. The reactant gases substantially free of oxygenated compounds are removed overhead from absorption zone 15 by means of line 18 and introduced as a recycle stream into reaction zone 1.

The absorption medium is withdrawn from the bottom of absorption zone 15 by means of line 19 and passed into recovery zone 20. Temperature and pressure conditions are maintained in recovery zone 20 so as to remove overhead by means of line 21 the oxygenated compounds. These compounds are condensed in condensing zone 22 and withdrawn from the system as a final product by means of line 23. These compounds are handled in a manner to segregate any desired cut or fraction. The absorption medium is withdrawn from the bottom of recovery zone 20 by means of line 24 passed through cooling zone 25 and re-introduced by means of pump 26 and line 17 into the top of absorption zone 15. The desired temperature in recovery zone 20 is maintained by means of heating means 27.

The process of my invention may be varied widely. The invention generally comprises removing reactant gases from the reaction zone, treating these reactant gases in a manner to remove oxygenated products and then recycling said gases relatively free of oxygenated products to the reaction zone.

The catalysts employed in the reaction zone may be any suitable catalyst as for example, iron, cobalt or nickel supported on any suitable carrier and containing any desirable promoter and the like. The operation may either be a fixed bed or a fluid type operation wherein the catalyst is maintained in the fluid state. Temperatures and pressure as well as feed rates may be adjusted to secure the desired products. The amount of gases recycled to the reaction zone may be adjusted over a wide range.

Although an absorption zone utilizing polyethylene glycol is shown for the removal of the oxygenated compounds from the recycle gas, it is to be understood other absorption medium as for example water, water methanol mixtures, ethylene chlorohydrin may be employed.

Other means likewise may be used for the removal of the oxygenated compounds from the recycle gas other than an absorption system. For example, solid absorbents silica gel or similar drying agents may be employed.

The process of the present invention is not to be limited by any theory as to mode of operation but only in and by the following claims in which it is desired to claim all novelty insofar as the prior art permits.

I claim:

1. Improved process for the production of hydrocarbons containing more than one carbon atom in the molecule from gases comprising oxides of carbon and hydrogen which comprises contacting said feed gases in a reaction zone with an iron catalyst under temperature and pressure conditions to secure hydrocarbons containing more than one carbon atom in the molecule, removing overhead reactant gases and cooling the same to condense water and condensable hydrocarbons, separating uncondensed gases from the condensate, and treating at least a portion of said uncondensed gases with a solvent adapted to remove substantially all of the oxygenated hydrocarbons which are formed in said reaction zone from said gases, and recycling said solvent treated gases free of oxygenated compounds to said reaction zone.

2. Process in accordance with claim 1 in which said reactant gases are solvent treated with polyethylene glycol in an absorption zone.

JACK C. DART.

REFERENCES CITED

The following references are of record in the file of this patent:

UNITED STATES PATENTS

| Number | Name | Date |
|---|---|---|
| 1,870,816 | Lewis | Aug. 9, 1932 |
| 2,224,048 | Herbert | Dec. 3, 1940 |
| 2,279,052 | Michael | Apr. 7, 1942 |
| 2,369,710 | Bludworth | Feb. 20, 1945 |
| 2,417,164 | Huber | Mar. 11, 1947 |